July 18, 1950     J. F. O'BRIEN ET AL     2,515,255
ELECTRICAL CONDUIT WIRING SYSTEM
Filed Feb. 26, 1946     2 Sheets-Sheet 1
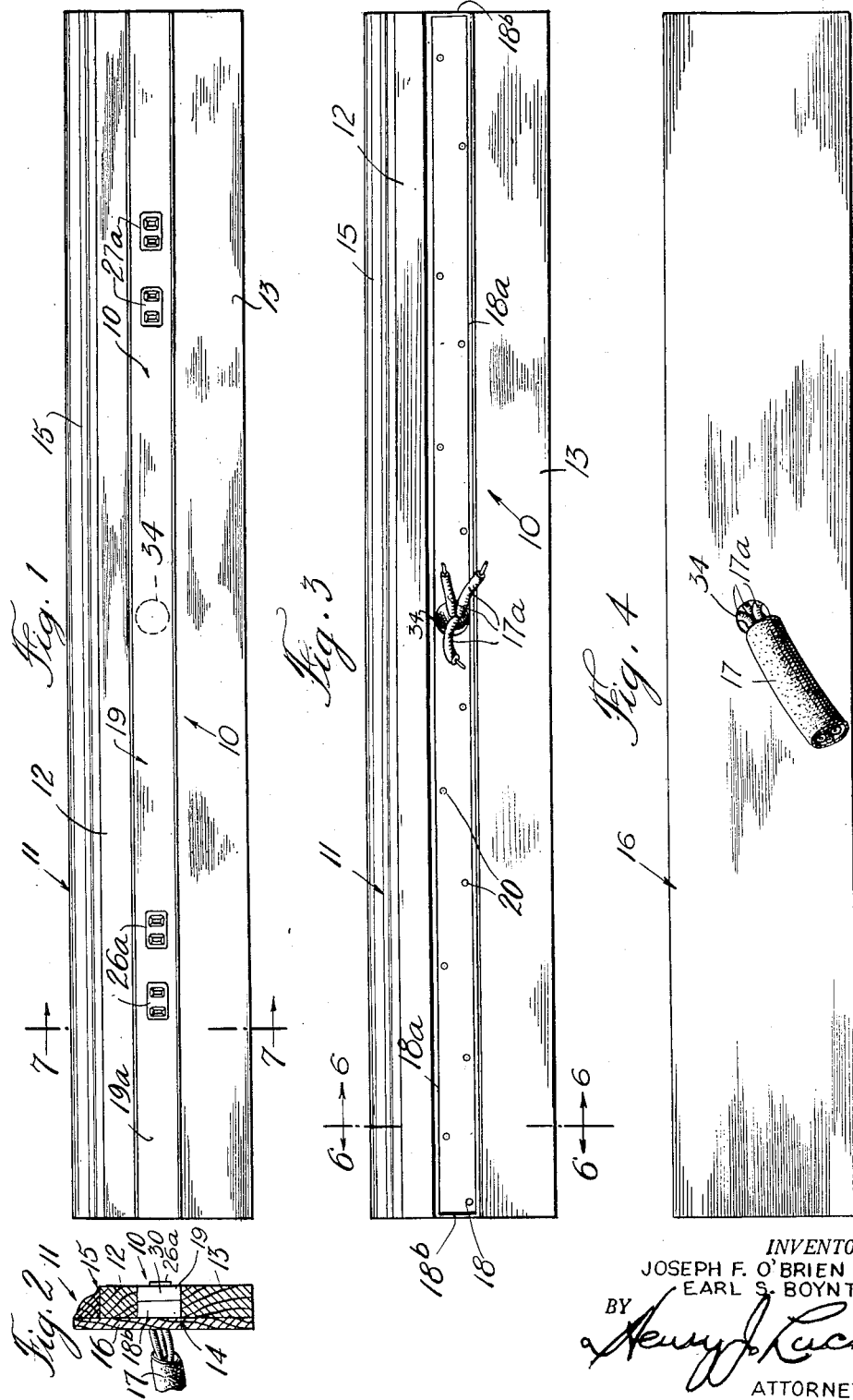
INVENTORS
JOSEPH F. O'BRIEN
EARL S. BOYNTON
BY
ATTORNEY

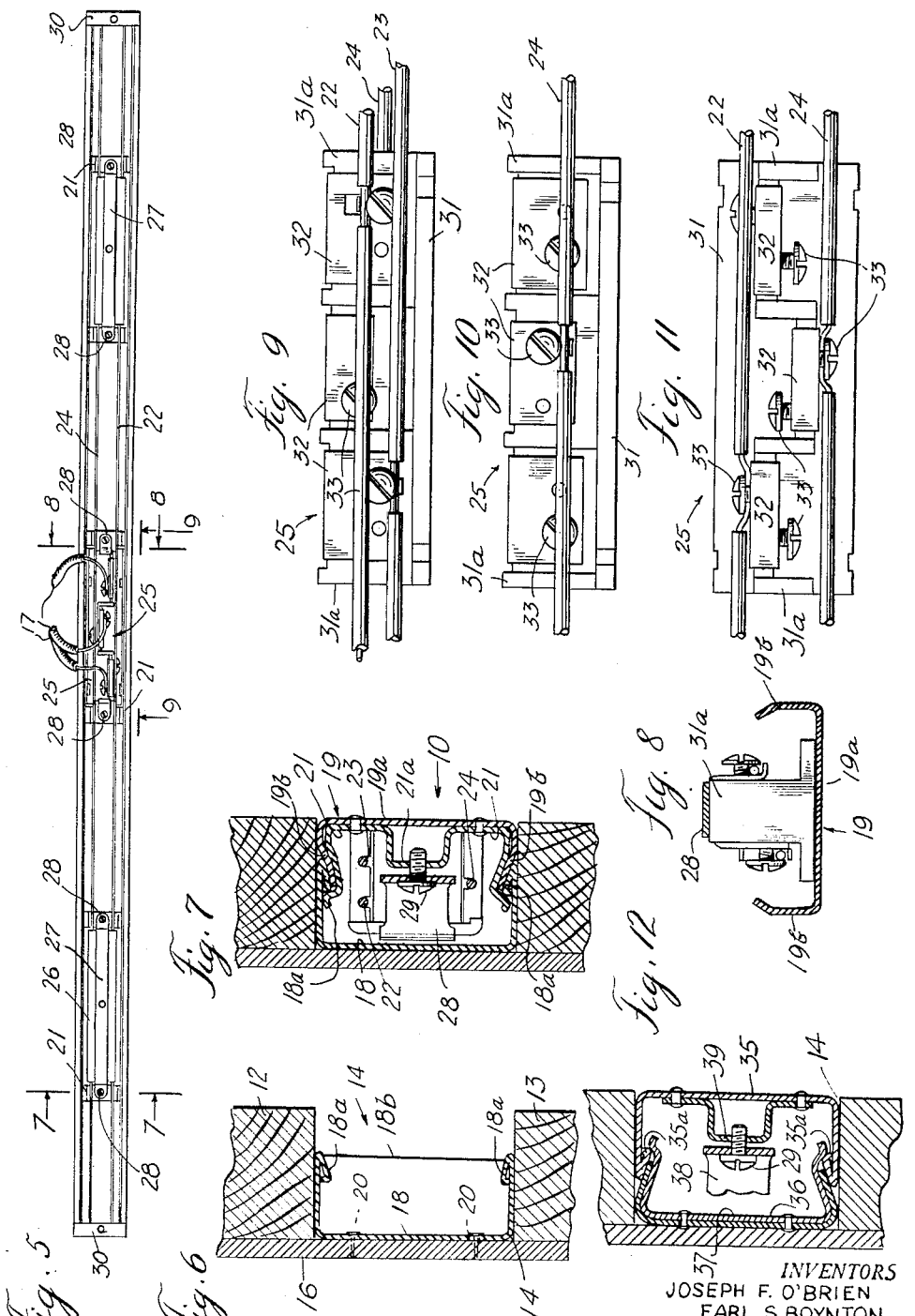
INVENTORS
JOSEPH F. O'BRIEN
EARL S. BOYNTON
BY Henry J. Lucke
ATTORNEY Patented July 18, 1950

2,515,255

UNITED STATES PATENT OFFICE 2,515,255

ELECTRICAL CONDUIT WIRING SYSTEM

Joseph F. O'Brien, Lebanon, and Earl S. Boynton, East Orange, N. J., assignors to John B. Pierce Foundation, New York, N. Y., a corporation of New York Application February 26, 1946, Serial No. 650,346

1 Claim. (Cl. 174—101)

The invention relates to conduit wiring systems.

More particularly, the invention relates to conduit systems housing electrical conductors and auxiliary devices of a wiring system.

An object of the invention is to provide an electrical conduit system whose electrical conductors and any auxiliary devices associated therewith, such as power source connectors for feeding electric power into the system, or an outlet receptacle offering plug-in connection for a variety of electric utility appliances, may be readily removed for inspection, repair, or replacement and readily re-installed.

An object of the invention is the provision of a separable conduit housing having a supporting base part and a cover part arranged to fit on and be supported by the base part, the conductor elements and the accessory devices being secured to the cover part for removal therewith as a unit.

The cover part is advantageously formed to snap on to the base part, whereby the separation and the removal of the cover part from the base part and its replacement thereon may be easily and quickly accomplished.

Other objects and features of the invention will become apparent from the following detailed description, and the preferred specific embodiment illustrated in the accompanying drawings.

In the drawings:

Fig. 1 is a front elevation of a partial length of electrical conduit pursuant to the invention, as incorporated in a specially constructed base board portion of the structural building trim of a room;

Fig. 2 is a left side elevation of Fig. 1;

Fig. 3 is a view similar to that of Fig. 1, but having the cover and thereto attached elements removed from the body part of the electric conduit;

Fig. 4 is a rear elevation of Fig. 1;

Fig. 5 is an inside or rear elevation of the cover part with the thereto attached elements;

Fig. 6 is a transverse section, considerably enlarged, taken on line 6—6 of Fig. 3;

Fig. 7 is a transverse section, similarly enlarged, taken on line 7—7 of Fig. 1;

Fig. 8 is a transverse section, similarly enlarged, taken on line 8—8 of Fig. 5;

Fig. 9 is a detail side elevation, on the enlarged scale, of the power source connector device, taken on line 9—9 of Fig. 5;

Fig. 10 is a detail side elevation of the power source connector device of Fig. 9, showing the opposite side in elevation;

Fig. 11 is a detail rear view of Fig. 9; and

Fig. 12 is a sectional view corresponding to that of Fig. 7 but illustrating another embodiment of the separable housing, pursuant to the invention, its outlet receptacle device being removed for clarity of illustration.

The electrical conduit pursuant to the invention, indicated generally at 10, is preferably set within a correspondingly dimensioned channel or recess provided in the supporting structure with which it is associated so that the face plate thereof lies substantially flush with the exposed finish face of such supporting structure. In the illustrated application, the supporting structure is shown as a composite base board 11, which is made up of the longitudinal members 12 and 13, serving to define the rectangular channel or recess 14, the moulding strip 15, and the back plate 16.

The conduit 10 may be of any desired length, as may be determined by the requirements of installation. In instances of prefabricated house construction, it is advantageous to select its length to correspond to that of the one or more walls of the room in which it is installed. For such purpose standard sections may be fabricated having respective lengths co-extensive with the lengths of the particular wall sections, and each section may be provided with its individual feed device, connected with the source of electrical power; the concealed power cable 17 indicates such power source.

Structurally, the electrical conduit 10 comprises a base part 18 of longitudinally extended channel formation, which serves as the support, and a removable cover part 19 which is longitudinally coextensive with such base part and carries as a unit the essential electrical elements.

The base part 18 is preferably formed of sheet metal whose longitudinal margins are turned inwardly against the channel sides to thereby provide longitudinally extending ribs $18^a$, $18^a$, see Figs. 3 and 6, for the purposes hereinafter set forth, and whose ends are turned upwardly to provide end closures $18^b$, $18^b$. Such base part is firmly secured within the channel or recess 14, as by means of nails 20 driven into base board 11, so that its bottom and sides lie snugly against the bottom and sides, respectively, of the channel or recess, see Fig. 6.

The cover part 19 is desirably of channel formation, and is substantially co-extensive dimensionally with the base part 18. It is formed, however, to fit upon the base part, having a flat panel member $19^a$ which serves as the exposed finish face plate of the conduit. The flanges or sides $19^b$, depending from the longitudinal edges of the panel member $19^a$, are adapted to fit against the upper inner portions of the channel sides of the base part, thereby providing a substantially closed conduit housing.

It is advantageous, to afford easy and quick removal and replacement of the cover part, that the cover part be arranged to snap into place on the body part. To this end resilient clips 21 are secured to the inner face of the cover part at spaced intervals along the length thereof, such clips being formed and arranged to engage in locking relationship, with the longitudinal ribs 18a of the base part, as illustrated in Fig. 7.

The component parts of the electrical system employed, may be selected as desired. As illustrated in the drawings, the electrical system comprises three electrical conductors providing for continuously "hot" and switch controlled outlet circuits, respectively.

The two sheathed electrical conductors 22 and 23 and connected with the supply to respectively provide the two outlet circuits, the sheathed conductor 24 serving as a common return. These conductors extend along the length of the conduit and are supported by connections with the auxiliary devices. These auxiliary devices include the power connector 25, for connecting the respective electrical conductors with the three-wire power cable 17, and two double-socket outlet receptacles 26 and 27, see Fig. 5. The several auxiliary devices are each attached firmly to the cover part 19, as by means of clamping lugs 28, the clamping screws 29 of which thread into suitably tapped saddle parts 21a of the resilient clips 21, see Fig. 7. End shields 30, formed of suitable insulating material and secured to the cover part 19 at the respective ends thereof, receive the terminal ends of the electrical conductors 22, 23, and 24 and serve to support the same. They also cooperate with the end members 18b of the base part in closing the ends of the conduit housing.

The feed unit 25, as here illustrated, is of the type set forth in our copending application Serial No. 654,322, entitled Electrical Interconnecting Devices, filed March 14, 1946, allowed May 9, 1949. It comprises an insulating body 31, which includes a frame member 31a upon which are mounted a set of three mutually independent contact saddles 32. Binding screws 33, threaded into opposite respective legs of each saddle, serve to establish electrical connection of a conductor with one leg of a saddle and a similar electrical connection of the corresponding lead 17a from power source cable 17 with the other leg of the saddle. In this manner the required three independent connections with the power source cable is accomplished most effectively. It should be noted that the leads 17a from power source cable 17 extend within the conduit housing through an aperture 34 provided therefor in the bottom of channel body part 18, such aperture registering with a corresponding aperture provided in the back piece 16 of base board 11.

The outlet receptacle devices 26 and 27 are provided with respective plug-in outlet plates 26a and 27a, respectively, Figs. 1 and 2, which fit within suitably provided apertures of the face plate 19a of the cover part. The outlet receptacle devices may be selected as desired, but are preferably of the type set forth in our copending application Ser. No. 658,053, filed March 29, 1946, entitled Electrical Outlet Receptacle Devices.

As above described, the base part of the electrical conduit is provided with longitudinally extending internal ribs 18a, 18a, and the cover part with the resilient clips adapted for latching and locking engagement with such ribs effected by the "snapping" of the cover part onto the base part. As illustrated in the embodiment of Fig. 12, the positioning of these inter-engaging elements may be reversed. Thus, longitudinally extending internal ribs 35a may be formed along the margins of the side walls 35b of the channel-shaped cover part 35 for latching and locking engagement with the resilient clips 36, secured within the channeled base part 37. In such construction, the auxiliary devices 25, 26, and 27 are secured within the cover part 35, as by clamping lugs 38, similar to the lugs 28. In the embodiment of Fig. 12, the saddle strap pieces 39 perform the function of the saddle portions 21a of the resilient clips 21 of the previously described embodiment.

The particular electrical elements and the particular engagement of such elements, as illustrated in the drawings, have been found to provide a highly efficient arrangement for the electrical conduit pursuant to the invention. However, other types and arrangements, including those well known to those skilled in the art, may be employed in connection with the generic structural combination of the invention, and while specific embodiments of the invention are illustrated in the drawings and described herein, it is apparent that various structural changes may be made therein and various other specific embodiments may be developed by those skilled in the art without departing from the spirit and generic purview of the invention as set forth herein and defined by the claim which here follows.

We claim:

An electrical conduit wiring system comprising a base part of longitudinal channel formation arranged for securement to a fixed support; a conduit cover part of longitudinal channel formation substantially conforming in outline to said base part, said base part and said cover part being complementary to one another; said base part having its longitudinal margin turned inwardly against its channel sides to provide longitudinally extending ribs; and a resilient clip secured to the inner face of said cover part formed and arranged to engage in locking relation with the longitudinally extending ribs of said base part; said resilient clip forming a saddle part thereof by means of which the electrical conductors and the several auxiliary devices may be firmly attached to said cover part, whereby the separation and removal of said cover part, with the electrical conductors and auxiliary devices, from said base part and its replacement thereon may be easily and quickly effected.

JOSEPH F. O'BRIEN.
EARL S. BOYNTON.

REFERENCES CITED

The following references are of record in the file of this patent:

UNITED STATES PATENTS

| Number | Name | Date |
|---|---|---|
| 1,106,103 | Lutz | Aug. 4, 1914 |
| 1,817,034 | Hotchkin | Aug. 4, 1941 |
| 1,905,143 | Carr | Apr. 25, 1933 |
| 1,966,379 | Dodge | July 10, 1934 |
| 1,995,855 | Lee | Mar. 26, 1935 |
| 2,023,004 | Clayton | Dec. 3, 1935 |
| 2,064,199 | Elder | Dec. 15, 1936 |
| 2,137,536 | McConnell | Nov. 22, 1938 |
| 2,250,276 | Rutherford | July 22, 1941 |
| 2,267,745 | O'Brien | Dec. 30, 1941 |
| 2,455,231 | Clayton | Nov. 30, 1948 |